United States Patent
Eisenmann et al.

(10) Patent No.: US 8,309,042 B2
(45) Date of Patent: Nov. 13, 2012

(54) PROCESS FOR REDUCING GANGUE BUILD-UP IN THE REACTOR DURING THE CHLORIDE PROCESS THAT USES RECYCLED ORE

(75) Inventors: Matthew Donnel Eisenmann, Winchester, VA (US); Jorge Lavastida, La Place, LA (US); Timothy Josiah McKeon, Diamondhead, MS (US); James Elliott Merkle, Jr., Long Beach, MS (US)

(73) Assignee: E I du Pont de Nemours and Company, Wilmington, DE (US)

( * ) Notice: Subject to any disclaimer, the term of this patent is extended or adjusted under 35 U.S.C. 154(b) by 34 days.

(21) Appl. No.: 12/523,736

(22) PCT Filed: Jan. 23, 2008

(86) PCT No.: PCT/US2008/000947
§ 371 (c)(1), (2), (4) Date: Jul. 20, 2009

(87) PCT Pub. No.: WO2008/091674
PCT Pub. Date: Jul. 31, 2008

(65) Prior Publication Data
US 2009/0311170 A1    Dec. 17, 2009

Related U.S. Application Data

(60) Provisional application No. 60/897,174, filed on Jan. 24, 2007.

(51) Int. Cl.
C01G 23/00    (2006.01)
(52) U.S. Cl. .......... 423/85; 423/69; 423/76; 423/77; 423/492; 423/610
(58) Field of Classification Search .......... 423/76, 423/77, 85, 69, 492, 610
See application file for complete search history.

(56) References Cited

U.S. PATENT DOCUMENTS

| | | | |
|---|---|---|---|
| 3,208,866 A | 9/1965 | Lewis et al. | |
| 3,608,836 A * | 9/1971 | Bryant et al. | ............ 241/16 |
| 4,225,422 A | 9/1980 | Trevoy et al. | |
| 5,015,264 A | 5/1991 | Story et al. | |
| 5,201,949 A | 4/1993 | Allen et al. | |
| 5,669,509 A | 9/1997 | Sherman | |
| 6,399,033 B1 * | 6/2002 | Hartmann | ............ 423/74 |

FOREIGN PATENT DOCUMENTS

| | | |
|---|---|---|
| AU | 2002226423 | 8/2002 |
| DE | 10103977 | 7/2002 |
| EP | 0714992 | 4/1998 |
| WO | WO99/02456 | 1/1999 |

OTHER PUBLICATIONS

International Search Report, May 19, 2009.

* cited by examiner

*Primary Examiner* — Patricia L Hailey
*Assistant Examiner* — Melissa Stalder
(74) *Attorney, Agent, or Firm* — Gregory J. Feulner

(57) ABSTRACT

The disclosure provides a process for recycling ore in the chloride process, without the build-up of silica-containing gangue in the chlorination reactor.

12 Claims, 2 Drawing Sheets

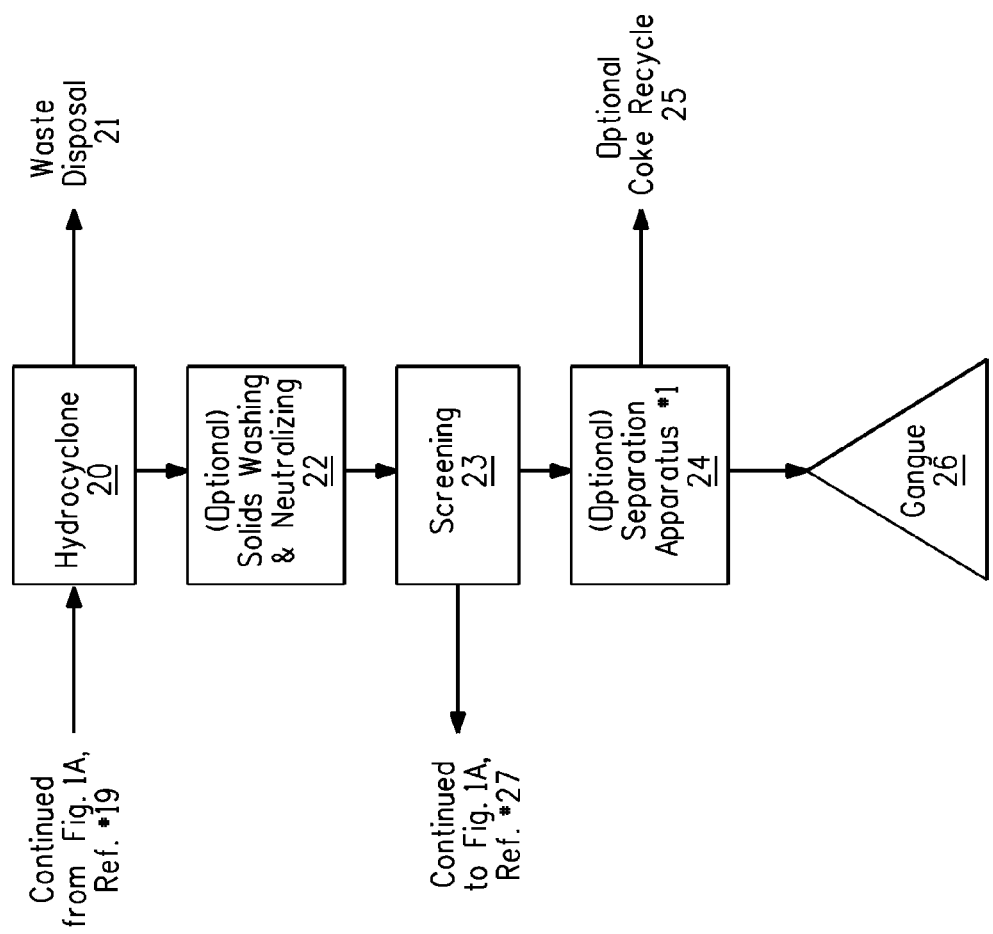

PROCESS FOR REDUCING GANGUE BUILD-UP IN THE REACTOR DURING THE CHLORIDE PROCESS THAT USES RECYCLED ORE

BACKGROUND OF THE DISCLOSURE

1. Field of the Disclosure

The present disclosure relates to a process for recycling ore in the chloride process, and in particular to an improved process for reducing silica-containing gangue from the recycled ore stream.

2. Background of the Disclosure

In a continuous process for producing pigmentary titanium dioxide ($TiO_2$), titanium-containing ore, coke and chlorine are reacted in a chlorination reactor, typically a fluidized bed reactor, at temperatures ranging from about 900 to about 1600 C. Discharged from the reactor are gaseous volatile metal chlorides, in combination with other ingredients, such as, unreacted titanium dioxide ($TiO_2$), silica-containing gangue, and other components comprising coke that are entrained in the discharge gases. This stream, after separation of the gaseous volatile metal chlorides, may then be returned to the reactor. However, presence of the silica-containing gangue in the recycle stream may cause gangue build-up in the reactor that results in more blow-over and eventual ore loss.

Previous efforts to minimize unreacted titanium dioxide ore losses in the chlorinator have focused on capturing all ore and gangue solids and feeding them back into the chlorinator. However, this increases the gangue concentration in the chlorinator and the proportion of blow-over of solids leading to titanium dioxide yield loss.

A need exists for a process whereby the silica-containing gangue present in the solids in the discharge stream is reduced to minimize ore loss.

SUMMARY OF THE DISCLOSURE

The present disclosure provides a process for preparing titanium dioxide that comprises the chlorination of titanium-containing ore in a fluidized bed chlorination reactor and includes discharging from the reactor a mixture comprising metal chlorides, unreacted titanium dioxide, silica-containing gangue, and other components, wherein the silica-containing gangue comprises silica particles having a particle size greater than the particle size of at least the untreated titanium dioxide, and wherein the ratio of the unreacted titanium dioxide to silica-containing gangue is about 6:1, more typically about 3.5:1, comprising:

(a) cooling the mixture to form particles comprising condensed metal chlorides and a solid mixture comprising unreacted titanium dioxide, silica-containing gangue, and other components;

(b) preparing an aqueous suspension of the particles comprising condensed metal chlorides and the solid mixture comprising unreacted titanium dioxide, silica-containing gangue, and other components whereby the condensed metal chlorides are dissolved;

(c) separating unreacted titanium dioxide and silica-containing gangue from the other components and dissolved condensed metal chlorides;

(d) feeding the unreacted titanium dioxide and silica-containing gangue through a screen to separate the unreacted titanium dioxide from the silica-containing gangue having a particle size greater than the particle size of at least the untreated titanium dioxide;

(e) drying the unreacted titanium dioxide; and (f) feeding the dried unreacted titanium dioxide back to the reactor.

BRIEF DESCRIPTION OF THE DRAWINGS

FIGS. 1A and 1B show in block diagram format the ore recovery process of the disclosure wherein the untreated titanium dioxide in the gaseous mixture exiting the reactor is separated from the silica-containing gangue.

DETAILED DESCRIPTION OF THE DISCLOSURE

Figure 1A:
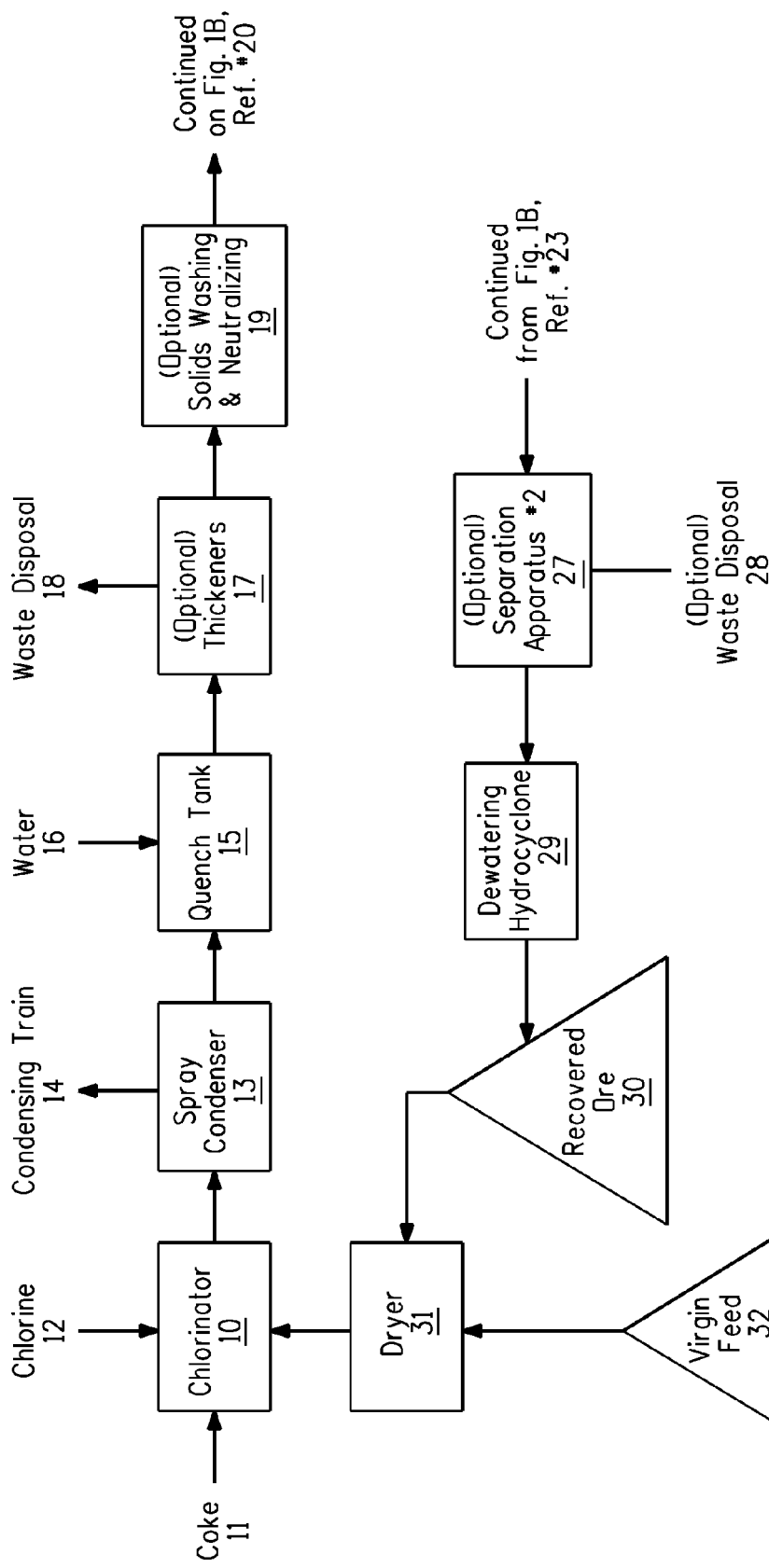

The production of $TiO_2$ pigment by vapor phase oxidation of a tetrahalide, particularly $TiCl_4$, in the presence of a nucleant is known and disclosed in Lewis et al., U.S. Pat. No. 3,208,866 and Allen et al., U.S. Pat. No. 5,201,949, the disclosures of which are incorporated herein by reference. The present disclosure relates to an improvement in the aforementioned processes wherein the untreated titanium dioxide in the in the gaseous mixture exiting the reactor is separated from the silica-containing gangue. The silica-containing gangue comprises particles having a particle size greater than the particle size of at least the untreated titanium dioxide. The ratio of the unreacted titanium dioxide to silica-containing gangue may be about 6:1, more typically about 3.5:1.

As shown in FIGS. 1A and 1B, in chlorinator reactor (10) the dried virgin ore (32), coke (11) and chlorine (12) are combined and reacted to form gaseous metal chlorides and other gases. This gaseous mixture is sent to a spray condenser (13) along with carryover of unreacted ore, coke and silica-containing gangue where most iron and undesirable chlorides are condensed to form solid particles. The gangue is a largely un-useful and a slow chlorinating minor constituent of the ore feed. The solid particles and condensed chlorides are separated in the spray condenser and fed to an aqueous quench tank (15). Water (16) is added to the quench tank to put the iron chlorides into solution. The quenched mixture may be treated in two possible ways.

In one embodiment, optional thickeners (17) may be directed to concentrate the solids from the iron chloride solution. This iron chloride solution may then be sent to waste disposal (18). The thickener underflow may be sent to the optional solids washing and neutralization (19) where belt filters, filter presses, or neutralizers may be used to neutralize the solids. The neutralized solids may be then pumped to a hydrocyclone or hydrocyclones (20) to separate any remaining neutralized iron, and fine carbon from the unreacted ore and gangue solids. The hydrocyclone overflow (21) is primarily made up of fine carbon, neutralized iron fine ore and fine gangue. The hydrocyclone overflow (21) is sent to waste disposal.

The hydrocyclone (20) underflow may be fed to screens (23) for size classification. While this process may be best operated as a wet screening operation with Derrick Corp. high frequency screens as the typical screen type, any screening of this material including drying the solids and screening dry may be done. The screen size may be determined based on providing the most recovery of unreacted $TiO_2$ to the screen undersize while rejecting the coarse silica-containing gangue to the oversize. For example, about 150 microns may be chosen as the best particle size at which to make the cut between the coarse silica-containing gangue and the unreacted $TiO_2$. The primary importance of the screen is to reject $SiO_2$ containing gangue that is coarse enough have a low probability of being ejected from the chlorinator bed.

A typical method for determining the screen size (cutpoint) for separating the unreacted titanium dioxide particles from the gangue particles is described in the following steps:
1. Provide a plurality of screen sizes for the unreacted titanium dioxide particles and the gangue particles to pass through and calculate the cumulative percent of unreacted titanium dioxide particles passing through each screen size and calculate the cumulative percent of gangue particles passing through each screen size.
2. Plot the cumulative percent passing through each screen size of the unreacted titanium dioxide particles and the cumulative percent passing through each screen size of the gangue particles
3. Determine the screen size with the greatest difference between the two curves. This becomes point A. This point is also known as the point of highest separation efficiency. It can also be determined by calculating the average of the cumulative recovery of unreacted titanium dioxide particles and the cumulative rejection of gangue particles.
4. Determine the screen size that 100% of the unreacted titanium dioxide particles are smaller than and this becomes point B.
5. The separating screen size is determined as:

separating screen size=point $A+(X)$ point $B$.

Where X is a weighting factor based on the desired yield. The screen size must also be small enough to reject the gangue with a low probability of ejection from the chlorinator (10).

This method will keep the chlorinators from accumulating gangue while recycling the unreacted $TiO_2$ back to the chlorinator. Some suitable screen sizes include about 600 to about 75 microns, more typically about 300 to about 105 microns and most typically about 212 to about 150 microns.

The screen oversize (+150 micron) may be sent to an optional separator #1 (24) for recovery of carbon from the coarse $SiO_2$ containing gangue. This carbon may be recovered using froth flotation to provide a carbon product that is low in ash and useful for its BTU value. Two forms of froth flotation equipment, conventional flotation cells and Eriez HydroFloat flotation technology, may be acceptable. The typical method may be the Eriez HydroFloat due to its better recovery of coarse particles. The $SiO_2$ containing gangue may be sent to waste disposal (26) for further handling.

The screen undersize (−150 micron) which is rich in unreacted $TiO_2$ may be sent to an optional separation apparatus #2 (27) to remove any remaining carbon from the enriched unreacted $TiO_2$. Again froth flotation may be used to remove the carbon from the unreacted $TiO_2$. Both conventional flotation cells and column flotation cells provide adequate carbon recovery with minimal unreacted TiO2 losses.

The enriched unreacted $TiO_2$ from either the screen (23) undersize or the optional froth flotation underflow (27) may be pumped to a dewatering device (29). The typical dewatering device would be a hydrocyclone set up for dewatering rather than a particle size cut point. Other dewatering devices such as belt filters, filterpresses, and centrifuges could also be used to remove water prior to drying the $TiO_2$ enriched stream. The dewatering hydrocyclone (29) underflow may be stacked in a pile to further dewater the $TiO_2$ enriched stream known as recovered ore. The dewatering hydrocyclone overflow water (30) may be reused as recycle water in the process.

The pile dried recovered ore may then be fed to a dryer (31) such as a rotary kiln, fluid bed, or spray dryer where it may be dried along with the virgin feed (32) prior to being fed to the chlorinator reactor (10).

In a second embodiment, the quench tank discharge may be taken directly to the hydrocyclone or hydrocyclones (20). The hydrocyclone overflow (21) is primarily made up of fine carbon and iron chloride solution and fine ore and fine silica-containing gangue. The hydrocyclone overflow (21) may be sent to waste disposal. The hydrocyclone (20) underflow may be fed to the optional solids washing and neutralization step (22). This step can be done many ways such as counter current fluidized washing, belt filters or filter presses. The typical option is to use counter current fluidized washing using a tank with water addition at the bottom and the solids feed at the top in the same manner as a Stokes Hydrosizer. Caustic may be added to the washed solids to complete the neutralization process.

The washed and neutralized solids may then be fed to the screens (23) for size classification. While this process is best operated as a wet screening operation with Derrick Corp. high frequency screens as the preferred screen type, any screening of this material including drying the solids and screening dry may be done. The screen size may be determined based on providing the most recovery of $TiO_2$ to the screen undersize while rejecting the coarse gangue to the oversize. For example, about 150 microns may be chosen as the best particle size at which to make the cut. The primary importance of the screen is to reject $SiO_2$ containing gangue that is coarse enough have a low probability of being ejected from the chlorinator bed. The method for determining the screen size (cut-point) described earlier for embodiment 1 may be used here. This method will keep the chlorinators from accumulating gangue while recycling the unreacted $TiO_2$ back to the chlorinator.

The screen oversize (+150 micron) may be sent to an optional separator #1 (24) for recovery of carbon from the coarse $SiO_2$ containing gangue. This carbon may be recovered using froth flotation to provide a carbon product that is low in ash and useful for its BTU value. Two forms of acceptable froth flotation equipment include conventional flotation cells and Eriez HydroFloat flotation technology. The typical method may be the Eriez HydroFloat due to its better recovery of coarse particles. The $SiO_2$ containing gangue may be sent to waste disposal (28) for handling.

The screen undersize (−150 micron) that may be rich in unreacted $TiO_2$ may be sent to an optional separation apparatus #2 (27) to remove any remaining carbon from the enriched unreacted $TiO_2$. Again froth flotation may be used to remove the carbon from the unreacted $TiO_2$. Both conventional flotation cells and column flotation cells provide adequate carbon recovery with minimal unreacted $TiO_2$ losses.

The enriched unreacted $TiO_2$ from either the screen (23) undersize or the optional froth flotation underflow (27) is pumped to a dewatering device (29). The typical dewatering device would be a hydrocyclone set up for dewatering rather than a particle size cut point. Other dewatering devices such as belt filters, filter presses, and centrifuges may also be used to remove water prior to drying the $TiO_2$ enriched stream. The dewatering hydrocyclone (29) underflow may be stacked in a pile to further dewater the $TiO_2$ enriched stream known as recovered ore. The dewatering hydrocyclone overflow water (30) may be reused as recycle water in the process.

The pile dried recovered ore may be fed to a dryer (31) such as a rotary kiln, fluid bed, or spray dryer where it may be dried along with the virgin feed (32) prior to being fed to the chlorinator reactor (10).

After screening, the enriched untreated titanium dioxide is typically recycled directly to the chlorinator without any mechanical size reducing step such as grinding.

Since the process rejects the coarse gangue particles; that is, the gangue particles having a particle size greater than the particles of at least the untreated titanium dioxide, at the screening step, the unreacted titanium dioxide recycled back to the chlorinator is enriched. By enriching the unreacted titanium dioxide stream in this way, most of the gangue is not recycled to the chlorinator. Thus, the proportion of gangue in the recycle stream relative to unreacted titanium dioxide is significantly lower than the proportion of gangue contained in the underflow fraction of the hydrocyclone.

The process takes advantage of the chlorinator reactions to provide selective separation of gangue and unreacted titanium dioxide. The ore and gangue enter the chlorinator with similar particle size characteristics with gangue particles tending to be slightly larger than the ore particles. As the ore reacts the ore particle sizes shrink, while the gangue particles react more slowly so the gangue particle sizes tend not to shrink as quickly. This size shift is further enhanced by re-deposition of gangue particles on gangue particles causing the gangue particles to grow. The net result is that the ore particles become smaller while the gangue particles become larger. The screening process of this disclosure removes the larger gangue particles so that the enriched unreacted titanium dioxide stream can be recycled to the chlorinator while the oversize gangue particles are discarded.

In one embodiment, the disclosure herein can be construed as excluding any element or process step that does not materially affect the basic and novel characteristics of the composition or process. Additionally, the disclosure can be construed as excluding any element or process step not specified herein.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The description of illustrative and preferred embodiments of the present disclosure is not intended to limit the scope of the disclosure. Various modifications, alternative constructions and equivalents may be employed without departing from the true spirit and scope of the appended claims.

What is claimed is:

1. A process for preparing titanium dioxide that comprises chlorination of titanium-containing ore in a fluidized bed chlorination reactor and includes discharging from the reactor a mixture comprising metal chlorides, an unreacted titanium dioxide, a silica-containing gangue, and other components, wherein the silica-containing gangue comprises particles having a particle size greater than the particle size of at least the untreated titanium dioxide, and wherein the ratio of the unreacted titanium dioxide to silica-containing gangue is about 6:1, comprising coke, the process comprising:
    (a) cooling the mixture to form particles comprising condensed metal chlorides and a solid mixture comprising the unreacted titanium dioxide, the silica-containing gangue, and the other components comprising coke;
    (b) preparing an aqueous suspension of the particles comprising condensed metal chlorides and the solid mixture comprising unreacted titanium dioxide, silica-containing gangue, and other components from step (a) whereby the condensed metal chlorides are dissolved;
    (c) separating the unreacted titanium dioxide and the silica-containing gangue from the other components and the dissolved condensed metal chlorides;
    (d) feeding the unreacted titanium dioxide and silica-containing gangue through a screen to separate the unreacted titanium dioxide from the silica-containing gangue having a particle size greater than the particle size of at least the untreated titanium dioxide;
    (e) drying the unreacted titanium dioxide; and
    (f) feeding the dried unreacted titanium dioxide back to the reactor without any mechanical size reducing of the recovered titanium dioxide.

2. The process of claim 1 wherein cooling of the mixture in step (a) is accomplished using a spray condenser.

3. The process of claim 1 wherein separating in step (c) is accomplished using at least one hydrocyclone.

4. The process of claim 1 wherein screening in step (d) is wet screening.

5. The process of claim 1 wherein screening in step (d) is dry screening.

6. The process of claim 1 wherein drying in step (e) comprises dewatering.

7. The process of claim 6 wherein dewatering is accomplished in at least one hydrocyclone, belt filter, filter press or centrifuge.

8. The process of claim 7 wherein drying further comprises treatment in a rotary kiln, a fluid bed dryer, or spray dryer.

9. The process of claim 8 wherein drying is accomplished after combining with virgin ore.

10. The process of claim 1 wherein in step (d) the screen has a pore size of from 600 to 75 µm.

11. The process of claim 1 wherein in step (d) the screen has a pore size of from 300 to 105 µm.

12. The process of claim 1 wherein in step (d) the screen has a pore size of from 212 to 150 µm.

* * * * *